United States Patent Office 3,335,177
Patented Aug. 8, 1967

3,335,177
PROCESS FOR PREPARING 2-METHOXY-3,6-DICHLOROBENZOIC ACID
Allen M. Robin, Claremont, Calif., assignor to Velsicol Chemical Corporation, Chicago, Ill., a corporation of Illinois
No Drawing. Filed May 28, 1964, Ser. No. 371,077
8 Claims. (Cl. 260—521)

This invention relates to a method of preparing a chemical composition of matter. More specifically, this invention relates to the preparation of 2-methoxy-3,6-dichlorobenzoic acid. This acid and certain of its derivatives have been found to be extraordinarily active herbicides, useful for the control of a wide variety of undesirable weed species.

In order that the acid and its derivatives can be used economically as agricultural pesticides, a process by which the parent acid can be prepared readily and in good yield is highly desirable. It has now been found that the acid can be prepared from 3,6-dichlorosalicylic acid, also known as 2-hydroxy-3,6-dichlorobenzoic acid, by reacting the starting material with methyl chloride in an aqueous medium which has a pH greater than about ten. This process has been found unexpectedly to give good yields of the desired acid with a minimum of side products.

The conventional method of preparing 2-methoxy-3,6-dichlorobenzoic acid would be to treat the 3,6-dichlorosalicylic acid with a reagent such as dimethyl sulfate. It has been found, however, that dimethyl sulfate has a number of important disadvantages which make its use for the methylation of 3,6-dichlorosalicylic acid undesirable. Dimethyl sulfate is markedly toxic to human beings; and its liquid physical form makes it difficult to avoid splashing and consequent dermal contact when used on a large scale. Further, it has been found that the use of large excesses of dimethyl sulfate are required to obtain good yields of the desired methyl ether. One reason for the large excesses required is that the utilization of the dimethyl sulfate is poor in the reaction forming the ether, while another reason is that the use of this reagent gives rise to nearly 1:1 molar formation of the methyl ester of the benzoic acid, which must then be totally hydrolyzed with consequent waste of a large portion of the methylating agent. Only one of the methyl groups in dimethyl sulfate is reactive, which accounts in part for the poor utilization of this comparatively expensive reagent.

Further, it has been found that only poor yields of the desired 2-methoxy-3,6-dichlorobenzoic acid are obtained when 3,6-dichlorosalicylic acid is treated with dimethyl sulfate in the conventional manner in an aqueous solution of alkali metal base. In order to improve the yields, the reaction must be carried out in a medium wherein a solvent such as anhydrous acetone is used and the base is a material such as anhydrous potassium carbonate. The cost of such expensive anhydrous reagents and the care required to maintain an anhydrous reaction medium on a large scale are therefore further disadvantages making the use of dimethyl sulfate undesirable.

It is therefore an object of this invention to provide a method for the preparation of 2-methoxy-3,6-dichlorobenzoic acid which utilizes reagents which can be handled safely.

It is another object of this invention to provide a method for the preparation of 2-methoxy-3,6-dichlorobenzoic acid which avoids the use of large excesses of reagents and in which there is minimal formation of undesired side-products.

It is a further object of this invention to provide a method for the preparation of 2-methoxy-3,6-dichlorobenzoic acid in which economic, high yields of product are obtained with readily available and inexpensive reagents.

The method of this invention comprises reacting 3,6-dichlorosalicylic acid with methyl chloride in an aqueous medium which has a pH greater than about ten and recovering the 2-methoxy-3,6-dichlorobenzoic acid therefrom. The fact that methyl chloride can be used as the methylating agent in this method to obtain high yields of 2 - methoxy - 3,6 - dichlorobenzoic acid was surprising and unexpected. It has been found, however, that the pH of the reaction mixture is critical to the successful use of methyl chloride for the methylation of 3,6-dichlorosalicylic acid.

Indeed, if the pH of the reaction mixture is allowed to drop to 10 or below, the reaction produces large amounts of undesired by-products and a product of relatively low purity. If the pH of the reaction mixture is considerably lower than 10, such as 7 or lower, then the reaction stops or proceeds at such a slow rate as to be undetectable or impractical. In the method of this invention, at least two moles of metal base are used in aqueous solution to treat each mole of 3,6-dichlorosalicylic acid employed. Suitable metal bases are sodium hydroxide, potassium hydroxide, sodium carbonate, potassium carbonate, calcium hydroxide, magnesium hydroxide, and the like. When the minimum amount of base has been added to form the metal salts of the carboxy and phenolic groups in the 3,6-dichlorosalicylic acid, further metal base is added to bring the pH of the solution above 10. While the reaction proceeds satisfactorily in solutions which have pH values above 10, a large excess of alkali metal base is not necessary. The reaction can be carried out at pH values of 10 or higher. Nevertheless, it is preferred that the pH of the reaction mixture be maintained between about 10 and 12, since the higher pH value reaction mixtures are not beneficial and there is no need to use them in this reaction. Furthermore, there is a tendency when the pH of the reaction mixture is above 12 for the formation of undesired by-products. Such desirable pH values can be maintained in the method of this invention by adding small amounts of metal base as required. While the aqueous medium in the method of this invention will ordinarily comprise water alone as the solvent, other solvents or diluents can also be used in addition to the water.

After the aqueous metal salt solution of the 3,6-dichlorosalicylic acid has been prepared, methyl chloride gas is introduced into the reaction vessel, suitably under pressure. The exact pressure to be used will largely be determined by the reaction temperature and other factors. A convenient pressure range has been found to be from about 50 to about 150 pounds per square inch gauge, while a preferred pressure range is from about 80 to about 100 pounds per square inch gauge. Pressures higher than 150 pounds per square inch gauge are operable and produce results comparable to those obtained at the lower pressures; but, since there is no need to use these higher pressures which require special equipment, procedures, etc., it is satisfactory to operate within the pressure range previously stated. The precise temperature at which the reaction is carried out is not critical, but it is convenient to employ temperatures in the range from about 75° to about 150° C. A particularly convenient and preferred temperature range is from about 80° to about 100° C. It has also been found that vigorous and efficient agitation of the reaction mixture favors the formation of the desired product in good yield.

The reaction is continued until about two moles of methyl chloride have reacted for each mole of 3,6-dichlorosalicylic acid charged. The reaction mixture at this point will consist of a mixture of the metal salt of 2-methoxy - 3,6 - dichlorobenzoic acid and some methyl ester of 2 - methoxy - 3,6 - dichlorobenzoic acid. It is therefore necessary to hydrolyze the methyl ester, and this can be accomplished by treating the reaction mixture with additional metal base. The reaction mixture is heated, preferably at reflux temperature, to complete the hydrolysis.

The desired 2-methoxy-3,6-dichlorobenzoic acid can then be separated from the reaction mixture by acidification. Mineral acids such as hydrochloric acid, sulfuric acid, and the like are most conveniently used for the acidification. The reaction mixture can be acidified to a pH of about 1, at which point the desired product will crystallize out of solution. It can be recovered by filtration or centrifugation and washed with water. The 2-methoxy-3,6-dichlorobenzoic acid obtained in this manner will be quite pure and can be used directly for pesticidal purposes without further purification. Drying of the product as in a forced-air dryer, for example, is all that is required. However, if a very pure product is desired, the solid can be recrystallized from a suitable solvent such as pentane to give white crystals, melting point 114–116° C.

The method of this invention can be expected to give yields of 2-methoxy-3,6-dichlorobenzoic acid which are nearly quantitative. The method therefore makes use of readily available reagents which are easily handled to give high yields of the desired product, thereby obviating the disadvantages of techniques known in the prior art. The following examples illustrate the manner in which the method of this invention can be carried out.

*Example 1*

Dichlorosalicylic acid (980 pounds), having an assay of 75% 3,6-dichlorosalicylic acid, was dissolved in sodium hydroxide and water making 500 gallons of solution.

This material was methylated by addition of methyl chloride at 85–90° C. and 60–95 p.s.i.g. for 10 hours in a stirred stainless steel pressure vessel. During the majority of the run the pressure was held between 80–95 p.s.i.g. but when a new methylchloride cylinder was inserted into the system the pressure dropped temporarily to 60 p.s.i.g. The pH was initially 13 to 14, but as the reaction commenced the pH as measured by pH paper and a continuous flow meter dropped. The pH was maintained during reaction in the range 10–12 by the periodic addition of sodium hydroxide (18½ gallons; 50% NaOH). Methylchloride (580 pounds) was injected into the pressure vessel in the course of the reaction.

At the end of the 10-hour reaction period, any unused methylchloride was vented and sodium hydroxide (25 gallons; 50% NaOH) was added for the hydrolysis. The charge was refluxed for 5½ hours converting the esters to the free acids.

There was obtained 650 gallons of reaction mixture containing 990 pounds of organic acids which assayed 78.8% 2 - methoxy - 3,6 - dichlorobenzoic acid by I.R. analysis.

*Example 2*

Dichlorosalicylic acid (750 pounds) having an assay of 81.1% 3,6-dichlorosalicylic acid was dissolved in sodium hydroxide and water making 500 gallons of solution.

This material was methylated by addition of methyl chloride at 85–90° C. and 48–97 p.s.i.g. for 10 hours in a stirred stainless steel pressure vessel. During the majority of the run the pressure was held between 80–95 p.s.i.g. but when a new methylchloride cylinder was inserted into the system the pressure dropped temporarily to 60 p.s.i.g. The pH was initially 12 to 12.5, but as the reaction commenced the pH as measured by pH paper and a continuous flow meter dropped. The pH was maintained during the reaction in the range 10.5–11.5 by the periodic addition of sodium hydroxide (18½ gallons; 50% NaOH). Methylchloride (610 pounds) was injected into the pressure vessel in the course of the reaction.

At the end of the 10-hour reaction period, any unused methylchloride was vented and sodium hydroxide (25 gallons; 50% NaOH) was added for the hydrolysis. The charge was refluxed for 5½ hours converting the esters to the free acids.

There was obtained 590 gallons of reaction mixture containing 780 pounds of organic acids which assayed 80.3% 2-methoxy-3,6-dichlorobenzoic acid by I.R. analysis.

*Example 3*

3,6-dichlorosalicylic acid is charged with water into the apparatus described in Example 1. Sodium hydroxide is added until a pH of 10 is attained. The mixture is then heated to a temperature of 75° C., at which point methyl chloride gas is introduced under pressure. The reaction is then carried out until about 2 moles of methyl chloride have reacted for each mole of 3,6-dichlorosalicylic acid charged, the temperature being held at 75° C. while the pressure is held at 70 p.s.i.g. and the pH is maintained at 10 by the addition of more NaOH as required. The reaction mixture is then hydrolyzed and acidified as described in Example 1 to give the desired 2-methoxy-3,6-dichlorobenzoic acid.

*Example 4*

A reactor fitted as described in Example 1 is charged with 3,6-dichlorosalicylic acid and water. Potassium hydroxide is added until a pH of 10 is obtained, whereupon the mixture is heated to 100° C. Methyl chloride gas is then introduced under pressure. The temperature is maintained at 100° C., the pressure is maintained at 100 p.s.i.g., and the pH is maintained at 13 by the addition of further KOH as required until about 2 moles of methyl chloride have reacted for each mole of 3,6-dichlorosalicylic acid charged. The product is hydrolyzed and acidified as described in Example 1. The precipitated product is then centrifuged, dried in a forced-air oven at 150° F., and finally recrystallized from pentane to give 2-methoxy-3,6-dichlorobenzoic acid, M.P. 114–116° C.

*Example 5*

A pressure vessel fitted as described in Example 1 is charged with 3,6-dichlorosalicylic acid and water. Sodium hydroxide is added until a pH of 10 is obtained. The mixture is then heated to 80° C., and methyl chloride gas is introduced under pressure. The temperature is held at 80° C. while the pressure is maintained at 90 p.s.i.g. and the pH at 14 until about 2 moles of methyl chloride have reacted for each mole of 3,6 - dichlorosalicylic acid charged. The reaction mixture is then hydrolyzed and acidified as described in Example 1 to precipitate the desired 2-methoxy-3,6-dichlorobenzoic acid, which is washed with water and dried.

I claim:
1. The method for the preparation of 2-methoxy-3,6-dichlorobenzoic acid, which comprises reacting 3,6 - dichlorosalicylic acid and methyl chloride in an aqueous medium which has a pH higher than about 10.

2. The method for the preparation of 2-methoxy-3,6-dichlorobenzoic acid which comprises reacting 3,6 - dichlorosalicylic acid and methyl chloride at a temperature of from about 75° C. to about 150° C. in an aqueous reaction medium which has a pH higher than about 10.

3. The method for the preparation of 2-methoxy-3,6-dichlorobenzoic acid which comprises reacting 3,6 - dichlorosalicylic acid and methyl chloride at a temperature of from about 75° C. to about 150° C. in an aqueous reaction medium which has a pH of between about 10 and about 12.

4. The method for the preparation of 2-methoxy-3,6-dichlorobenzoic acid which comprises reacting 3,6 - dichlorosalicylic acid and methyl chloride at a temperature at from about 75° C. to 150° C. at a pressure of at least about 50 pounds per square inch gauge in an aqueous reaction medium which has a pH higher than about 10.

5. The method for the preparation of 2-methoxy-3,6-dichlorobenzoic acid which comprises reacting 3,6 - dichlorosalicylic acid and methyl chloride at a temperature at from about 75° C. to about 150° C. at a pressure of at least about 50 pounds per square inch gauge in an aqueous medium which has a pH of between about 10 and about 12.

6. The method for the preparation of 2-methoxy-3,6-dichlorobenzoic acid which comprises reacting 3,6 - dichlorosalicylic acid and methyl chloride at a temperature at from about 80° C. to about 100° C. at a pressure between 50 to about 150 pounds per square inch gauge in an aqueous medium which has a pH of between about 10 and about 12.

7. The method for the preparation of 2-methoxy-3,6-dichlorobenzoic acid which comprises reacting 3,6 - dichlorosalicylic acid and methyl chloride at a temperature at from about 75° C. to about 150° C. at a pressure of at least about 50 pounds per square inch gauge in an aqueous medium which has a pH of between about 10 and about 12 and recovering 2-methoxy-3,6-dichlorobenzoic acid therefrom.

8. The method for the preparation of 2-methoxy-3,6-dichlorobenzoic acid which comprises reacting 3,6 - dichlorosalicylic acid and methyl chloride at a temperature at from about 75° C. to about 150° C. at a pressure of at least about 50 pounds per square inch gauge in an aqueous medium which has a pH of between about 10 and about 12 by the addition of at least two moles of metal base for each mole of 3,6-dichlorosalicylic acid charged, hydrolyzing the formed methyl ester of 2-methoxy-3,6-dichlorobenzoic acid with metal base, acidifying the aqueous solution of formed metal salt of 2-methoxy-3,6-dichlorobenzoic acid and separating 2-methoxy-3,6-dichlorobenzoic acid therefrom.

References Cited

UNITED STATES PATENTS

| | | | |
|---|---|---|---|
| 1,801,901 | 4/1931 | Britton et al. | 260—206 |
| 2,240,034 | 4/1941 | Caplan | 260—521 |
| 3,013,054 | 12/1961 | Richter | 260—521 |

LORRAINE A. WEINBERGER, *Primary Examiner.*

S. WILLIAMS, *Assistant Examiner.*